United States Patent [19]
Schorman et al.

[11] Patent Number: 5,960,350
[45] Date of Patent: Sep. 28, 1999

[54] METHOD AND SYSTEM FOR OPTIMIZING A TRAFFIC CHANNEL IN A WIRELESS COMMUNICATIONS SYSTEM

[75] Inventors: Eric Reed Schorman, Bedford; Walter Joseph Rozanski, Jr., Hurst; Michael Paul Clark, Southlake, all of Tex.

[73] Assignee: Motorola, Inc., Schaumburg, Ill.

[21] Appl. No.: 08/760,498

[22] Filed: Dec. 5, 1996

[51] Int. Cl.⁶ .................................................. H04Q 7/00
[52] U.S. Cl. .......................................... 455/450; 455/513
[58] Field of Search ...................... 455/422, 450, 455/517, 436, 162, 67.1, 63, 67.3, 65, 161.3, 179.1, 226.2, 513; 370/335, 342, 350, 331, 332

[56] References Cited

U.S. PATENT DOCUMENTS

| | | | |
|---|---|---|---|
| 5,095,535 | 3/1992 | Freeburg | 455/65 |
| 5,361,258 | 11/1994 | Arnold et al. | 455/63 |
| 5,491,837 | 2/1996 | Haartsen | 455/422 |
| 5,625,875 | 4/1997 | Whinnett et al. | 455/513 |
| 5,678,187 | 10/1997 | Meidan et al. | 455/62 |
| 5,745,841 | 4/1998 | Reudink et al. | 455/62 |
| 5,778,075 | 7/1998 | Haartsen | 455/422 |

OTHER PUBLICATIONS

Jen–Wei Liang And Arogyaswami J. Paulraj; "Forward Link Antenna Diversity Using Feedback For Indoor Communication Systems"; May 1995; pp. 1753–1755.

*Primary Examiner*—Reinhard J. Eisenzopf
*Assistant Examiner*—Marsha D. Banks-Harold
*Attorney, Agent, or Firm*—L. Bruce Terry

[57] ABSTRACT

In a wireless communications system (20), a beacon having a first radiation pattern (28) covering a portion of a subscriber service area (34) covered by a base station is transmitted. A subscriber (36) reception quality is then measured to produce a first beacon quality measurement (210). Thereafter, the first radiation pattern is changed to a second radiation pattern (32, 212), and a subscriber reception quality of the beacon transmitted with a second radiation pattern is measured to produce a second beacon quality measurement (214). In response to the first and second beacon quality measurements, a traffic channel radiation pattern (32) is selected (218), wherein such radiation pattern covers a portion of the subscriber service area. In a preferred embodiment, the beacon carrier frequency is the same as the traffic channel carrier frequency.

16 Claims, 2 Drawing Sheets

METHOD AND SYSTEM FOR OPTIMIZING A TRAFFIC CHANNEL IN A WIRELESS COMMUNICATIONS SYSTEM

FIELD OF THE INVENTION

The present invention relates in general to wireless communication systems, and more particularly to an improved method and system for optimizing traffic channel transmission in a wireless communications system using an adaptive antenna array.

BACKGROUND OF THE INVENTION

In a wireless communication system, "multipath" exists when there are multiple radio frequency transmission paths between the transmitter and receiver. If the secondary transmission paths can be characterized by the summation of several delayed and attenuated replicas of the desired signal, the multipath is called "specular multipath." This type of multipath may occur when the receiving antenna receives reflections from such obstacles as buildings, the earth, or the ionosphere. Receiving such multipath signals at the receiver may result in fluctuation of the received signal level. This is because the multipath wave is delayed by some time, $\tau$, compared with the direct wave. When multiple signals propagating over different paths combine at a subscriber or receiver location, fading may occur if the signals combine destructively.

Fading caused by destructive combination of multipath signals is frequency dependent. For example, if a signal from point A, the transmitter, takes multiple paths to point B, a subscriber, and these multiple signals having a first frequency combine destructively, a signal having a second frequency and traveling over the same multiple paths may combine in an additive manner at the subscriber location because of the difference in frequency. This is the well-known frequency selective fading phenomena.

In cellular communications systems, the use of adaptive antenna arrays has been proposed to improve uplink and downlink signal quality or to increase the range or capacity of cellular communication systems. Capacity may be increased because a subscriber's signal is transmitted in a direction so that the intended subscriber receives the signal while other subscribers may be spared from the noise of a signal not intended for them. Additionally, range may be increased because of antenna gain provided by a directional antenna.

An adaptive antenna array is composed of multiple spaced-apart antenna elements which may be driven by radio frequency signals having specific amplitude and phase relationships in order to control arid direct the antenna radiation pattern of the array. An adaptive antenna array may be implemented with a uniform linear array or other physical configurations.

Because fading characteristics are different at different frequencies, using an adaptive antenna array to form a downlink beam in the same direction as a most powerful uplink signal may not provide the best signal quality at the subscriber's location. This problem may occur in a communications system using an adaptive antenna array to direct antenna patterns toward a particular subscriber, the uplink signal strength received at the transmitter may have adequate signal strength while a downlink signal directed in the same direction as the uplink signal at the base station may not be received at the subscriber with adequate signal strength due to the difference in fading characteristics between the receive frequency and the transmit frequency. This is because signals on the uplink may combine additively while signals at a different frequency on the corresponding downlink may destructively combine. One known method of optimizing the efficiency of the traffic channel involves changing or perturbing the pattern of the traffic channel in order to find a better radiation pattern, or better radiation direction, for the traffic channel. The problem with this method is that the traffic channel may be degraded while the process searches for an improved radiation pattern.

Therefore, a need exists for an improved method and system of optimizing a traffic channel in a wireless communication system using adaptive antenna arrays and beam-formed traffic channels between transceivers.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
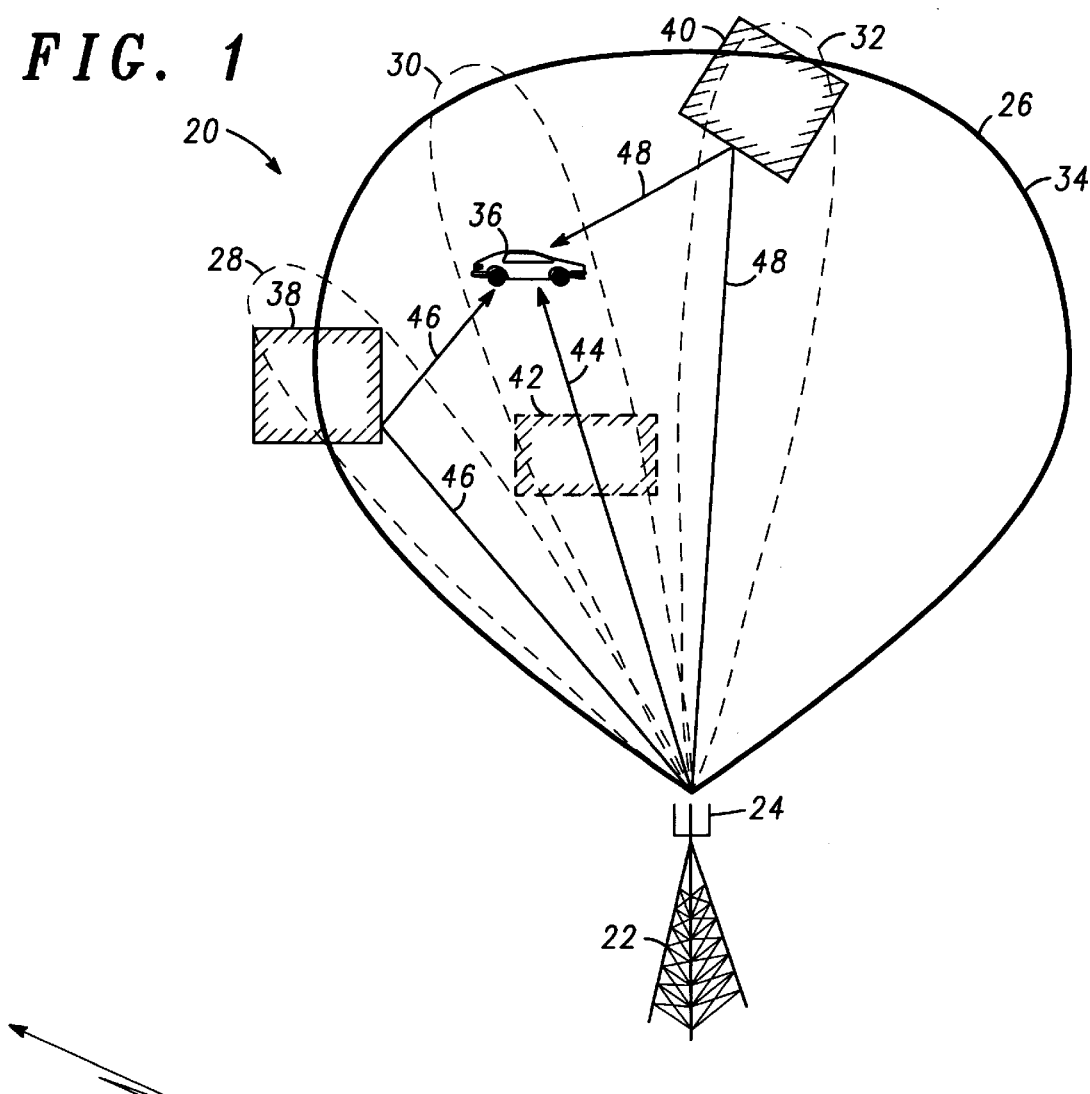
FIG. 1 depicts radio frequency signal propagation paths in a wireless communication system having an adaptive antenna array in accordance with the method and system of the present invention.

With reference now to the figures, and in particular with reference to FIG. 1, there is depicted a wireless communication system having an adaptive antenna array for optimizing a traffic channel in accordance with the method and system of the present invention. As shown, wireless communication system 20 includes antenna tower 22 having adaptive antenna array 24. An adaptive antenna array typically includes multiple spaced-apart antenna elements that can be driven by radio frequency signals to produce a selected radio frequency radiation pattern. Such a pattern may be controlled by selecting the amplitude and phase relationships of the signals used to drive the antenna elements of the array.

FIG. 1 shows four antenna patterns that may be selectively produced by adaptive antenna array 24: antenna pattern 26, 28, 30, and 32. Antenna pattern 26 provides communication services over a relatively broad area, which may be referred to as subscriber service area 34. Antenna patterns 28, 30, and 32 are narrowbeam radiation patterns that are formed by controlling the phase and amplitude relationships of the signals driving the antenna elements in adaptive antenna array 24. Antenna patterns 28–32 are examples of sector-shaped radiation patterns that cover a portion of the subscriber service area covered by the base station. For a further discussion of beamforming using adaptive antenna arrays see the article by A. Klouche-Djedid and M. Fujita entitled "*Adaptive Array Sensor Processing Applications for Mobile Telephone Communications,*" IEEE Transactions on Vehicular Technology, August 1996.

Also shown in FIG. 1 are subscriber 36 and buildings 38–42. Propagation paths 44–48 are examples of paths the radio frequency signal may take as it is transmitted between adaptive antenna array 24 and subscriber 36. Typically, the shortest distance between the antenna and the subscriber will provide the highest quality received signal. Therefore, propagation path 44 would probably provide the highest quality received signal at subscriber 36 if building 42 were not present. If building 42 is present, the signal traveling by propagation path 44 would be absorbed or reflected in another direction, and probably would not be received by subscriber 36. In that case, subscriber 36 would rely upon signals received by propagation paths 46 and 48. However, because propagation paths 46 and 48 both include a reflection, both paths are longer than propagation path 44. This means that the quality of the signal received by paths 46 and 48 may be below the quality of the signal received by path 44.

Such signal quality is typically measured by signal strength, with a higher signal strength indicating a higher quality signal. Alternatively, signal quality may be measured in relation to frame error rate, channel bit error rate, decoded bit error rate, or signal to noise estimates.

As mentioned above, fading may occur if multiple signals propagating over different paths combine at the subscriber location in a destructive manner. And fading caused by this destructive combination of multipath signals is frequency dependent. Therefore, an uplink signal, from subscriber 36 to tower 22, may be received via paths 46 and 48 with minimal effects of fading, while a downlink signal propagating over the same paths from tower 22 from subscriber 36, on a different frequency, may experience fading as a result of a destructive combination of signals. Note that in a typical code division multiple access (CDMA) system implementing an IS-95 air interface standard, the transmit and receive frequencies are 80 MHz apart in a 1900 Mhz system, and 45 Mhz apart in an 800 Mhz system, both of which are sufficiently different to cause the fading problems described above.

In accordance with an important aspect of the present invention, an antenna pattern 28, 30, or 32 is selected to optimize, or provide higher signal quality, for the downlink traffic channel from tower 22 to subscriber 36, thereby eliminating or reducing fading at subscriber 36 and reducing co-channel interference for subscribers located in service area 34 outside of the selected antenna pattern. (See FIG. 1) By using an antenna pattern that covers only a portion of subscriber service area 34, multiple propagation paths may be reduced or eliminated, which may reduce or eliminate the fading caused by destructive combinations of multipath signals. In FIG. 1, for example, either path 46 or 48 may be selected by selecting antenna pattern 28 or 32, respectively.

In addition to reducing fading, the selection of a narrow-beam antenna pattern may reduce the noise level at other subscribers located outside the selected antenna pattern, thereby increasing the capacity of the system.

Figure 2:
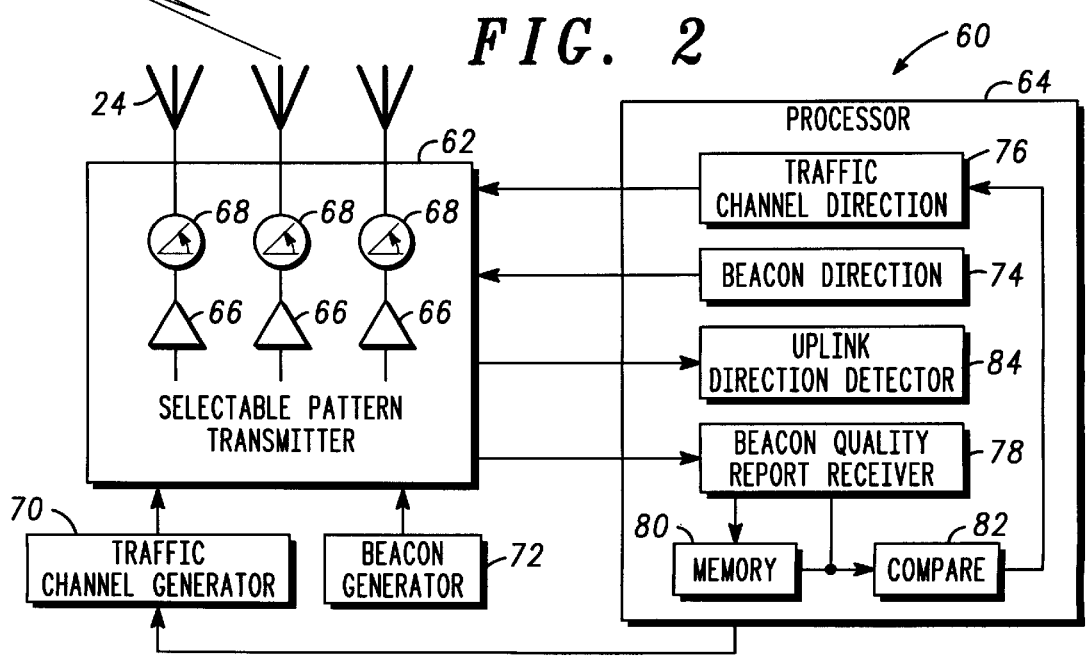
FIG. 2 is a high-level block diagram of a transceiver for driving an adaptive antenna array in accordance with the method and system of the present invention.

With reference now to FIG. 2, there is depicted a transceiver for optimizing a traffic channel in accordance with the method and system of the present invention. As shown, transceiver 60 includes selectable pattern transceiver 62 coupled to processor 64, which controls the selection of an antenna pattern produced by transceiver 62. As mentioned above, antenna patterns may be selected by controlling the relative phase and amplitude of signals used to drive an adaptive antenna array. Such gain controls are shown in FIG. 2 as gain controls 66, and the phase controls are shown at reference numeral 68.

Selectable pattern transceiver 62 is capable of simultaneously transmitting multiple input signals, each having its own selectable antenna pattern. In this example, two input signals are coupled to selectable pattern transceiver 62-a signal from traffic generator 70 and a signal from beacon generator 72. If transceiver 60 is designed to simultaneously communicate with multiple subscribers, each subscriber will have an associated downlink traffic generator, with an associated set of gain controls 66 and phase controls 68 for selecting an associated antenna pattern. Likewise, each beacon generator may have its own set of gain and phase controls (66 and 68) for shaping and directing each beacon independently. In a preferred embodiment, the signal provided by downlink traffic generator 70 is a voice or data signal modulated according to the Code Division Multiple Access (CDMA) air interlace standard IS-95 published by the Telecommunication Industry Association (TIA) Processor 64, which controls selectable pattern transceiver 62, includes beacon direction controller 74, traffic channel direction control 76, and beacon quality report receiver 78.

Direction controllers 74 and 76 may be used to control the selection of an antenna pattern for pattern transceiver 62 by sending control information in the form of gain and phase "weights" to gain controls 66 and phase controls 68. See Kraus, J. D., *Antennas,* McGraw Hill, 1988 for a more complete discussion of beamforming with linear arrays.

Beacon quality report receiver 78 may be used to receive quality reports from subscriber 76 regarding characteristics of the beacon signal received by subscriber 36. In a preferred embodiment, the received signal characteristic includes signal strength. Other signal quality indicators may include frame error rate, channel bit error rate, decoded bit error rate, or signal to noise plus interference. Beacon quality reports may be received from subscriber 36 in a special quality report message, or alternatively, the quality report may be embedded in control bits in the traffic channel transmitted from subscriber 36 to tower 22. Beacon quality reports may be sent from subscriber 36 in the same way the subscriber reports pilot signal strength according to a cell neighbor list.

Processor 64 may also include memory 80 and comparator 82. Memory 80 may be used to store a plurality of previous beacon quality reports, while comparator 82 may be used to compare a current quality report to any previous quality reports stored in memory 80. The results from comparator 82 may be used to select the best beacon quality reports (or those that exceed a threshold) and to control traffic channel direction controller 76.

In order to determine an initial traffic channel direction, processor 64 may include uplink direction detector 84, which may be used to detect best incoming traffic channel direction. An implementation of this technique is discussed in greater detail below.

Figure 3:
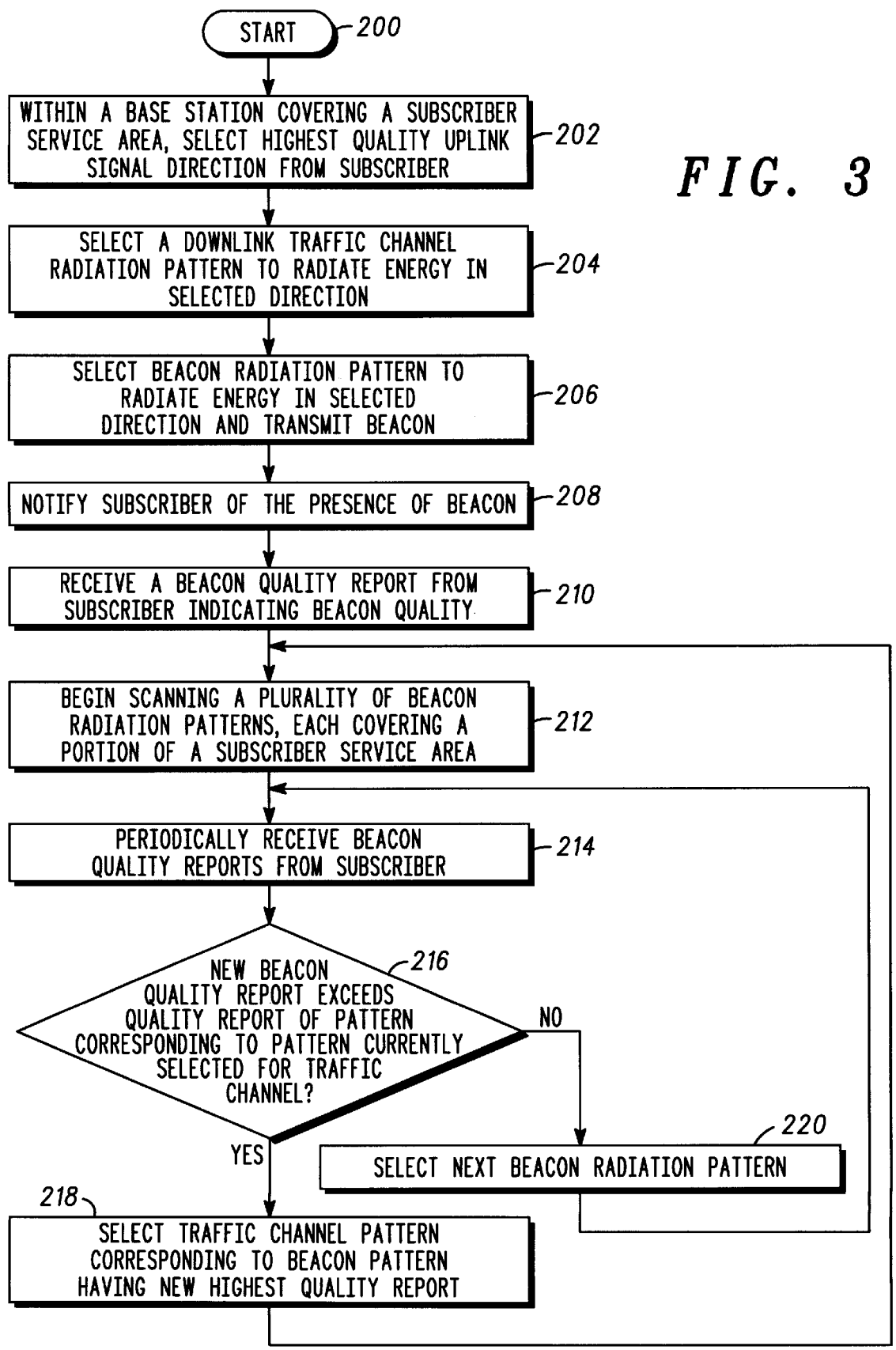
FIG. 3 is a high-level logic flowchart which illustrates the method and system of optimizing a traffic channel in a wireless communication system in accordance with the method and system of the present invention.

Referring now to FIG. 3, there is depicted a high-level logic flowchart that illustrates the method and system of optimizing a traffic channel in a wireless communication system in accordance with the method and system of the present invention. As illustrated, the process starts at block 200 and thereafter passes to block 202 wherein the process selects a direction of the highest quality uplink signal from a subscriber in the subscriber service area. Such a selection may be executed within the base station that covers the subscriber service area. For example, uplink direction detector 84 in transceiver 60 may be used to determine the incoming direction of a highest quality uplink signal. (See FIG. 2)

Determining the direction of the uplink signal may be implemented by examining the amplitude and phase relationships of signals received by the antenna elements in adaptive antenna array 24. See the article by A. Klouche-Djedid and M. Fujita entitled *"Adaptive Array Sensor Processing Applications for Mobile Telephone Communications,"* IEEE Transactions on Vehicular Technology, August 1996 for a more complete discussion of techniques for selecting the best signal.

Next, the process selects a traffic channel radiation pattern to radiate energy in the selected direction, as illustrated at block 204. In a preferred embodiment, the selected traffic channel radiation pattern is a narrowbeam pattern that covers a portion of the subscriber area covered by the base station. With reference to FIG. 1, if the path between tower 22 and subscriber 36 is unobstructed, the process will probably select the direction of propagation path 44 as the highest quality uplink signal direction because it is the shortest path and it is not attenuated by a reflection. However, if building 42 blocks propagation path 44, the process may select the direction of either propagation path 46 or 48, depending upon the quality of each respective uplink signal.

Once the direction of the best uplink signal is determined, a traffic channel radiation pattern is selected to radiate energy in the same direction. For example, if the direction of path 46 is the best uplink direction, antenna pattern 28 may be selected initially for a traffic channel radiation pattern. Similarly, if the best uplink direction corresponds to propagation path 48, antenna pattern 32 may be initially selected to radiate energy for the downlink traffic channel. Selection of the traffic channel radiation pattern may be implemented by transferring a set of weights to the gain and phase controls in transceiver 60.

Next, the process selects a beacon radiation pattern to radiate beacon signal energy in the selected direction, and the process begins transmitting the beacon, as depicted at block 206. In a preferred embodiment, the selected beacon radiation pattern substantially matches the downlink traffic radiation pattern selected in block 204. However, the beacon radiation pattern and the traffic channel radiation pattern need not be the same pattern.

Next, the process notifies the subscriber of the presence of the beacon, as illustrated at block 208. In IS-95 CDMA, base stations are identified with unique codes which are unique time offsets into a pseudo noise (PN) spreading code having a length of $2^{15}$. IS-95 also provides a means of informing the subscriber of the PN offsets of nearby cells so that the mobile may perform a faster search rather than exhaustively searching all possible offsets. In a preferred embodiment in a CDMA system, the subscriber may be informed of the beacon via a downlink message that indicates the PN offset of the unique beacon signal, assuming that the beacon signal is the same as the sector pilot signal with a different PN code or PN offset. In response to this message, the subscriber may add the beacon to its neighbor list, causing the subscriber to report on the beacon signal strength as the subscriber reports the signal strength of the broadly radiated pilot signals from both the current cell and neighboring cells.

After notifying the subscriber of the beacon, the process periodically receives a beacon quality report from the subscriber indicating the quality of the beacon signal, as depicted at block 210. As mentioned above, the subscriber measures and reports on the beacon quality in a manner similar to reporting the quality of pilot signals for current and neighboring cells. In a preferred embodiment, the beacon quality report indicates a measure of signal power of the beacon signal.

After receiving a beacon quality report with the beacon directed in the same direction as the best uplink signal, the process begins scanning or stepping through a plurality of beacon radiation patterns, wherein each pattern covers a portion of the subscriber service area, as illustrated at block 212. Therefore, with reference to FIG. 1, if the beacon radiation pattern was initially selected as antenna pattern 28, scanning begins the process of selecting alternate beacon radiation patterns, such as antenna patterns 30 and 32, which may be selected to scan the subscriber service area. Preferably, the entire subscriber service area is scanned by one or more beacon radiation patterns. Scanning algorithms may also be used, such as an algorithm that scans the directions of high quality received signals first, or one that first scans to the right and left of the high quality received signal directions.

In response to scanning or stepping through beacon radiation patterns, the process periodically receives beacon quality reports from the subscriber, as depicted at block 214. For example, if antenna pattern 28 is initially selected for transmitting the beacon, a first quality report may be received from subscriber unit 36. As scanning continues to change the beacon pattern, antenna pattern 30 may be selected, which may cause a lower quality report to be issued from subscriber 36 if building 42 blocks the beacon signal. As the scan continues further the beacon may use antenna pattern 32, wherein the beacon quality report may indicate a higher quality signal compared with the previous beacon using antenna pattern 30, which was blocked by building 42.

As the subscriber measures signal quality and as new beacon reports are received, the process determines whether or not the new beacon quality report exceeds the quality report of the beacon pattern corresponding to the traffic channel pattern currently selected, as illustrated at block 216. A beacon antenna pattern may be said to correspond to a traffic channel antenna pattern if the two patterns cause most of the energy to be radiated in the same general direction. In the simplest case, where the traffic channel antenna pattern and the beacon antenna pattern match, it may be said that the two patterns correspond to one another.

If the new beacon quality report exceeds the beacon quality report of the beacon pattern corresponding to the traffic channel pattern currently selected, the process selects the traffic channel pattern corresponding to new the beacon pattern responsible for the new high quality report, as depicted at block 218. If the new beacon quality report does not exceed the beacon quality report of the pattern corresponding to the current traffic channel pattern, the process continues to scan the subscriber service area by selecting the next beacon radiation pattern, as illustrated at block 220.

As the process steps through beacon patterns, a new traffic channel pattern may be selected as soon as a higher quality beacon report is received, or the process may wait until beacon reports have been received from most or all of the scanned portions of the subscriber service area before selecting a traffic channel radiation pattern.

If, at block 218, a new traffic channel radiation pattern is selected, the process iteratively returns to block 212 to continue scanning the service area with the beacon signal in search of a higher quality beacon signal report. Therefore, the process continuously searches for the best traffic channel radiation pattern by scanning the service area using a plurality of beacon radiation patterns to receive feedback in the form of beacon quality reports.

In a preferred embodiment, the beacon signal and the traffic channel signal have the same carrier frequency, which ensures the quality of the beacon signal received by the subscriber matches the quality of the traffic channel that will be received by the subscriber if the system decides to use a traffic channel antenna pattern that corresponds to the beacon antenna pattern.

In an alternate embodiment of the present invention, beacons that may be identified or distinguished from one another may be stepped through the subscriber service area as the subscriber measures the signal quality of each one. Then, the subscriber may select the beacon pattern that produces the most desirable signal quality, and request that the base station use a corresponding radiation pattern for the traffic channel radiation pattern. Or, at least the top few subscriber choices for a radiation pattern could be sent to the base station, and the infrastructure processor could make the final traffic channel radiation pattern selection. In this embodiment, some of the decision making process is shifted to the subscriber unit.

While the present invention has been described in the context of a base station that optimizes a downlink to a subscriber unit, the principles of the present invention may be applied with equal effectiveness to a subscriber unit that directs an uplink signal along a best uplink path from the subscriber unit to the base station.

The foregoing description of a preferred embodiment of the invention has been presented for the purpose of illustration and description. It is not intended to be exhaustive or to limit the invention to the precise form disclosed. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of optimizing a traffic channel in a wireless communication system:

transmitting a beacon having a first radiation pattern covering a portion of a subscriber service area covered by a base station, wherein said beacon is a spread spectrum signal that is at least substantially orthogonal to said traffic channel;

measuring a subscriber reception quality of said beacon transmitted with said first radiation pattern to produce a first beacon quality measurement;

changing said first radiation pattern to a second radiation pattern;

measuring a subscriber reception quality of said beacon transmitted with said second radiation pattern to produce a second beacon quality measurement; and in response to said first and second beacon quality measurements, selecting a traffic channel radiation pattern having a radiation pattern covering a portion of said subscriber service area covered by said base station.

2. The method of optimizing a traffic channel according to claim 1 wherein said beacon has the same frequency as said traffic channel.

3. The method of optimizing a traffic channel according to claim 1 wherein said step of selecting a traffic channel radiation pattern further includes the steps of:

comparing said first and second beacon quality measurements; and selecting a traffic channel radiation pattern substantially similar to said second radiation pattern if said second beacon quality measurement exceeds said first beacon quality measurement.

4. The method of optimizing a traffic channel according to claim 1 further including the steps of:

repeating said changing and measuring steps using a plurality of radiation patterns each covering selected portions of said subscriber service area covered by said base station;

selecting one of said plurality of radiation patterns associated with a beacon quality measurement that exceeds a threshold; and selecting a traffic channel radiation pattern in response to said selected one of said plurality of radiation patterns.

5. The method of optimizing a traffic channel according to claim 1 wherein said beacon quality measurement is a beacon signal strength measurement.

6. The method of optimizing a traffic channel according to claim 1 wherein said first radiation pattern covers a sector-shaped portion of said subscriber service area extending radially from said base station to the extent of said subscriber service area.

7. The method of optimizing a traffic channel according to claim 1 wherein said beacon is a time-offset spreading code.

8. The method of optimizing a traffic channel according to claim 1 further including transferring said first and second beacon quality measurements from said subscriber to said base station via an uplink traffic channel.

9. A system for optimizing a traffic channel in a wireless communication system:

means for transmitting a beacon having a first radiation pattern covering a portion of a subscriber service area covered by a base station, wherein said beacon is a spread spectrum signal that is at least substantially orthogonal to said traffic channel;

means for measuring a subscriber reception quality of said beacon transmitted with said first radiation pattern to produce a first beacon quality measurement;

means for changing said first radiation pattern to a second radiation pattern;

means for measuring a subscriber reception quality of said beacon transmitted with said second radiation pattern to produce a second beacon quality measurement; and means for selecting a traffic channel radiation pattern having a radiation pattern covering a portion of said subscriber service area covered by said base station in response to said first and second quality measurements.

10. The system for optimizing a traffic channel according to claim 9 wherein said beacon has the same frequency as said traffic channel.

11. The system for optimizing a traffic channel according to claim 9 wherein said means for selecting a traffic channel radiation pattern further includes:

means for comparing said first and second beacon quality measurements; and means for selecting a traffic channel radiation pattern substantially similar to said second radiation pattern if said second beacon quality measurement exceeds said first beacon quality measurement.

12. The system for optimizing a traffic channel according to claim 9 further including:

means for repeating said changing and measuring steps using a plurality of radiation patterns each covering selected portions of said subscriber service area covered by said base station;

means for selecting one of said plurality of radiation patterns associated with a beacon quality measurement that exceeds a threshold; and means for selecting a traffic channel radiation pattern in response to said selected one of said plurality of radiation patterns.

13. The system for optimizing a traffic channel according to claim 9 wherein said beacon quality measurement is a beacon strength measurement.

14. The system for optimizing a traffic channel according to claim 9 wherein said first radiation pattern covers a sector-shaped portion of said subscriber service area extending radially from said base station to the extent of said subscriber service area.

15. The system for optimizing a traffic channel according to claim 9 wherein said beacon is a time-offset spreading code.

16. The system for optimizing a traffic channel according to claim 9 further including means for transferring said first and second beacon quality measurements from said subscriber to said base station via an uplink traffic channel.

* * * * *